US008704993B2

(12) United States Patent
Lee et al.

(10) Patent No.: US 8,704,993 B2
(45) Date of Patent: Apr. 22, 2014

(54) LIQUID CRYSTAL DISPLAY

(75) Inventors: Sang-Hun Lee, Suwon-si (KR); Chul Huh, Yongin-si (KR); Gwan-Soo Kim, Asan-si (KR); Se-Ah Kwon, Seoul (KR); Yui-Ku Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 705 days.

(21) Appl. No.: 12/910,010

(22) Filed: Oct. 22, 2010

(65) Prior Publication Data
US 2011/0187631 A1 Aug. 4, 2011

(30) Foreign Application Priority Data

Jan. 29, 2010 (KR) .................. 10-2010-0008581

(51) Int. Cl.
*G02F 1/1339* (2006.01)
*G02F 1/1333* (2006.01)

(52) U.S. Cl.
USPC .......................................... 349/156; 349/110

(58) Field of Classification Search
USPC ........................................ 349/106, 110, 156
See application file for complete search history.

(56) References Cited

U.S. PATENT DOCUMENTS

| | | | |
|---|---|---|---|
| 6,281,960 B1 * | 8/2001 | Kishimoto et al. | 349/156 |
| 8,310,628 B2 * | 11/2012 | Sakata et al. | 349/106 |
| 2004/0195573 A1 | 10/2004 | Kim | |
| 2007/0040974 A1 | 2/2007 | Ninomiya et al. | |
| 2007/0103636 A1 * | 5/2007 | Hsiao | 349/156 |

FOREIGN PATENT DOCUMENTS

| | | |
|---|---|---|
| JP | 2000122072 | 4/2000 |
| JP | 2001100652 | 4/2001 |
| JP | 2005321784 | 11/2005 |
| JP | 2006106602 | 4/2006 |
| KR | 1020050052731 | 6/2005 |
| KR | 1020050070367 | 7/2005 |
| KR | 1020060000279 | 1/2006 |
| KR | 1020060001425 | 1/2006 |
| KR | 1020070089352 | 8/2007 |
| KR | 1020080026404 | 3/2008 |

OTHER PUBLICATIONS

Birendra Bahadur, Liquid Crystals Applications and Uses 1990, vol. 1, pp. 178-179.*

* cited by examiner

*Primary Examiner* — Edward Glick
*Assistant Examiner* — David Chung
(74) *Attorney, Agent, or Firm* — Cantor Colburn LLP

(57) ABSTRACT

A liquid crystal display includes a first insulation substrate, a plurality of gate lines and a plurality of data lines disposed on the first insulation substrate, a plurality of thin film transistors connected to the plurality of gate lines and the plurality of data lines, a plurality of pixel electrodes connected to the plurality of thin film transistors, a second insulation substrate disposed substantially opposite to the first insulation substrate; a plurality of column spacers disposed between the first and second insulation substrates and which supports the first and second insulation substrates, a light blocking member disposed on the first insulation substrate and including a sheet portion which includes an opening, a height controlling member disposed at the opening of the sheet portion of the light blocking member, where the plurality of column spacers is disposed on the height controlling member or the light blocking member.

24 Claims, 9 Drawing Sheets

LIQUID CRYSTAL DISPLAY

This application claims priority to and the benefit of Korean Patent Application No. 10-2010-0008581, filed on Jan. 29, 2010, and all the benefits accruing therefrom under 35 U.S.C. §119, the content of which in its entirety is herein incorporated by reference.

BACKGROUND OF THE INVENTION (1) Field of the Invention

The present invention relates to a liquid crystal display ("LCD"), and more particularly, to an LCD having column spacers with a substantially increased aperture ratio.

(2) Description of the Related Art

In general, a liquid crystal display ("LCD") includes two display panels having field generating electrodes, such as pixel electrodes and a common electrode, and a liquid crystal layer interposed therebetween. The LCD displays images by applying voltages to the field-generating electrodes to generate an electric field in the LC layer that determines the orientation of liquid crystal molecules in the liquid crystal layer to adjust polarization of incident light.

An active spacer may be used to maintain a constant cell gap between the upper and lower panels to maintain a constant interval between the two display panels of the LCD. The active spacer may typically be divided into two different types, one type includes a bead spacer and another type includes a column spacer.

The bead spacer may be employed with a simple process may be easy to manufacture. However, the bead spacer is floated inside the LCD such that the bead spacer may be moved along with liquid crystals when injecting the liquid crystals into the LCD. Accordingly, when the movement pressure is high and the movement distance is extended during injecting the liquid crystals, the alignment layer may be pressed such that light leakage is generated.

In contrast, since the column spacer may be formed by a photolithography process, the column spacer can be fixed to a desired location. However, since the column spacer has a lower elasticity and a weaker smear characteristic of enduring a weight compared to the bead spacer, the column spacer and an underlying layer thereof are collapsed when a substantially high external pressure is applied to the LCD panel, and stains may be thereby generated in the LCD panel.

To overcome the abovementioned deficiencies of the column spacer, the density and the size of the column spacer may be increased, or the smear characteristic of the column spacer may be improved such that the column spacer endures a predetermined degree of impact.

However, if the density or the size of the column spacer is increased, the elasticity of the column spacer is correspondingly decreased. In addition, when injecting the liquid crystal, the liquid crystal movement with the display is constrained. Also, the column spacer is typically positioned on a flat portion of a substrate such that a pattern such as a gate metal pattern is typically formed under the column spacer, while the gate metal pattern is disposed in the pixel area such that the aperture ratio is reduced.

BRIEF SUMMARY OF THE INVENTION

In an exemplary embodiment, a liquid crystal display including a column spacer is substantially endured against an external pressure without a reduction of elastic of the column spacer.

In an exemplary embodiment, an aperture ratio of a liquid crystal display including the column spacer is not reduced due to the column spacer.

In an exemplary embodiment, a liquid crystal display includes a first insulation substrate, a plurality of gate lines disposed on the first insulation substrate, a plurality of data lines disposed on the first insulation substrate substantially oblique to the plurality of gate lines, a plurality of thin film transistors connected to the plurality of gate lines and the plurality of data lines, a plurality of pixel electrodes connected to the plurality of thin film transistors, a second insulation substrate disposed substantially opposite to the first insulation substrate; a plurality of column spacers disposed between the first insulation substrate and the second insulation substrate and which supports the first insulation substrate and the second insulation substrate, a light blocking member disposed on the first insulation substrate and including a sheet portion, where the sheet portion of the light blocking member includes an opening, a height controlling member disposed at the opening of the sheet portion of the light blocking member, where the plurality of column spacers is disposed on at least one of the height controlling member.

In an exemplary embodiment, the liquid crystal display may further include a red color filter disposed on the first insulation substrate, a green color filter disposed on the first insulation substrate and a blue color filter disposed on the first insulation substrate, where the height controlling member includes a material substantially similar to a material of one of the red color filter, the green color filter and the blue color filter.

In an exemplary embodiment, the opening of the sheet portion of the light blocking member overlaps a thin film transistor of the plurality of thin film transistors.

In an exemplary embodiment, the plurality of column spacers may include a first spacer, a second spacer and a third spacer, a height of the first spacer, a height of the second spacer and a height of the third spacer may be different from one another, and at least one of the first spacer and the second spacer may be disposed on the height controlling member.

In an exemplary embodiment, the height of the first spacer may be greater than the height of the second spacer and less than the height of the third spacer, and the first spacer is in contact with the first insulation substrate and the second insulation substrate.

In an exemplary embodiment, an upper surface of the second spacer may be disposed below an upper surface of the first spacer at a distance in a range from about 0.3 micrometers to about 0.7 micrometers with respect to a plane defined by the upper surface of the first spacer.

In an exemplary embodiment, an upper surface of the third spacer may be disposed below the upper surface of the first spacer at a distance in a range from about 0.8 micrometers to about 1.2 micrometers with respect to a plane defined by the upper surface of the first spacer.

In an exemplary embodiment, a bottom area of the third spacer may be less than a bottom area of the first spacer and greater than a bottom area of the second spacer.

In an exemplary embodiment, a cross section of a lower portion of the first spacer may have a shape of a rectangle, a cross section of a lower portion of the second spacer may have a shape of an octagon, and a cross section of a lower portion of the third spacer may have a shape of a circle.

In an exemplary embodiment, the light blocking member may further include a linear portion extending substantially along the plurality of data lines, the sheet portion may be substantially perpendicularly connected to the linear portion, and the third spacer may be disposed on the linear portion.

In an exemplary embodiment, the liquid crystal display may further include a contact hole through which a pixel electrode of the plurality of pixel electrode is connected to a thin film transistor of the plurality of thin film transistors, and a colored member disposed on the pixel electrode of the plurality of pixel electrodes corresponding to the contact hole, where the colored member compensates a cut-out portion due to the contact hole.

In an exemplary embodiment, the colored member and the spacer include a same material.

In an exemplary embodiment, the first insulation substrate includes a display area which includes the pixel electrode, and the sum of the bottom area of the first spacer of the plurality of column spacers is in the range from about 0.2% to about 0.3% of the display area.

In an exemplary embodiment, the pixel electrode of the plurality of pixel may include a first sub-pixel electrode disposed on an upper portion of an individual pixel and a second sub-pixel electrode disposed on a lower portion of an individual pixel, the plurality of thin film transistor may include a first thin film transistor connected to the first sub-pixel electrode and a second thin film transistor connected to the second sub-pixel electrode, and the second sub-pixel electrode may be connected to a step-down capacitor.

In an exemplary embodiment, the sheet portion may be disposed between the first sub-pixel electrode and the second sub-pixel electrode.

In an exemplary embodiment, the plurality of thin film transistors includes may further include a third thin film transistor connected to the step-down capacitor, and an assistance height controlling member may be disposed on at least one of the third thin film transistor.

In an exemplary embodiment, the sheet portion of the light blocking member may include an opening which exposes the third thin film transistor, and the assistance height controlling member may be disposed at the opening which exposes the third thin film transistor.

In an exemplary embodiment, the liquid crystal display may further include a red color filter disposed on the first insulation substrate, a green color filter disposed on the first insulation substrate, and a blue color filter disposed on the first insulation substrate, where the assistance height controlling member includes a material substantially similar to a material of one of the red color filter, the green color filter and the blue color filter.

In an exemplary embodiment, the liquid crystal display may further include a height controlling member disposed on the first thin film transistor and the second thin film transistor, where the gate electrodes of the first thin film transistor and the second thin film transistor are commonly connected.

In an exemplary embodiment, the sheet portion may include an opening which exposes the first thin film transistor and the second thin film transistor, and the height controlling member may be disposed at the opening which exposes the first thin film transistor and the second thin film transistor.

In an exemplary embodiment, the first spacer may be disposed on the height controlling member, and the second spacer may be disposed on the assistance height controlling member.

In an exemplary embodiment, the liquid crystal display may further include a first contact hole through which the first sub-pixel electrode is connected to the first thin film transistor, a second contact hole through which the second sub-pixel electrode is connected to the second thin film transistor, and a colored member disposed on at least one of the first sub-pixel electrode and the second sub-pixel electrode corresponding to the first contact hole and the second contact hole, respectively, wherein the colored member compensates a cut-out portion due to the at least one of the first contact hole and the second contact hole.

In an exemplary embodiment, the colored member and the spacer may include a same material.

In an exemplary embodiment, the sheet portion may include an opening which exposes the first contact hole and the second contact hole.

In an exemplary embodiment, the liquid crystal display may endures against the external pressure without the increasing a number of the main spacer using the assistance spacer.

In an exemplary embodiment, the assistance spacer is not in contact with a substrate, and the movement of the liquid crystal is thereby not substantially limited.

In an exemplary embodiment, a metal pattern may not be formed for the column spacer, and the aperture ratio of the pixel is thereby substantially increased.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
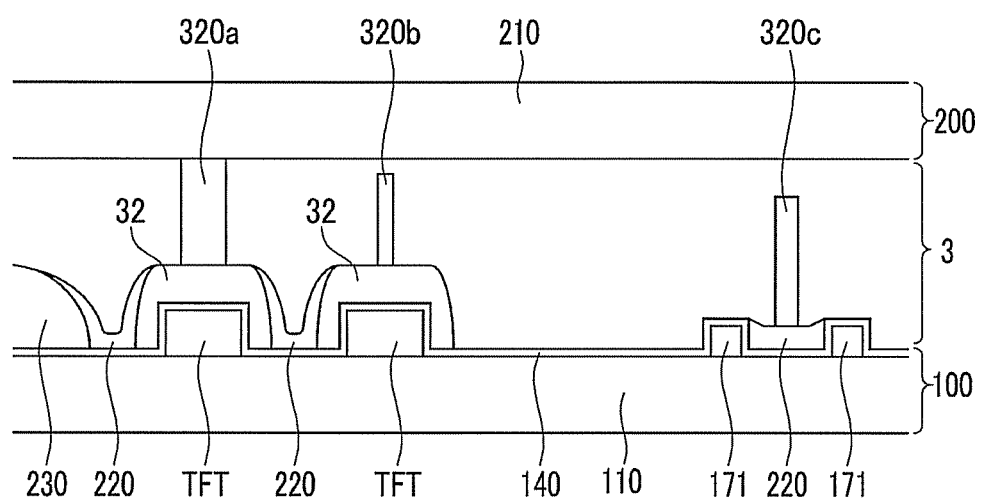
FIG. 1 is a partial cross-sectional view of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a liquid crystal display ("LCD") according to the present invention will now be described with reference to FIG. 1.

FIG. 1 is a partial cross-sectional view of an exemplary embodiment of an LCD according to the present invention.

As shown in FIG. 1, an exemplary embodiment of an LCD according to the present invention includes a lower panel 100 and an upper panel 200 facing each other, and a liquid crystal layer 3 interposed between the lower panel 100 and the upper panel 200.

The lower panel 100 includes a substrate 110, a color filter 230 disposed on the substrate 110, a light blocking member 220 disposed on the substrate 110 between the color filter 230 and a height controlling member 32 disposed on a thin film transistor ("TFT").

In an exemplary embodiment, a first spacer 320a and a second spacer 320b are disposed on the height controlling member 32, and a third spacer 320c is disposed on the light blocking member 220 disposed between two neighboring data lines 171.

The first spacer 320a is in contact with the lower and upper display panels 100 and 200, and thereby supports the lower and upper display panels 100 and 200 and maintains a uniform cell gap. In an exemplary embodiment, the second spacer 320a and the third spacer 320b are not in contact with the upper panel 100 and used as assistance spacers to maintain the uniform cell gap of the liquid crystal against an external impact. In an exemplary embodiment, the second spacer 320a and the third spacer 320b may endure against an external impact in a range from about 4 kilogram-force (kgf) to about 5 kilogram-force (kgf).

In an exemplary embodiment, a bottom area of the third spacer 320c, e.g., a cross-sectional area of the third spacer in proximity to the first substrate, is less than a bottom area of the first spacer 320a, e.g., a cross-sectional area of the first spacer in proximity to the first substrate, and greater than a bottom area of the second spacer 320b, e.g., a cross-sectional area of the second spacer in proximity to the first substrate. A height of the first spacer 320a is less than a height of the third spacer 320c and greater than a height of the second spacer 320b. In an exemplary embodiment, the upper surface of the second spacer 320b is disposed below an upper surface of the first spacer 320a at a distance in a range from about 0.2 micrometers (µm) to about 0.3 micrometers (µm) with respect to a plane defined by the upper surface of the first spacer 320a, and the upper surface of the third spacer 320c is disposed below the upper surface of the first spacer 320 at a distance in a range from about 0.7 µm to about 1.0 µm with respect to the plane defined by the upper surface of the first spacer 320a.

An exemplary embodiment of a liquid crystal display including the spacer of FIG. 1 will now be described in greater detail with reference to FIGS. 2 to 6.

Figure 2:
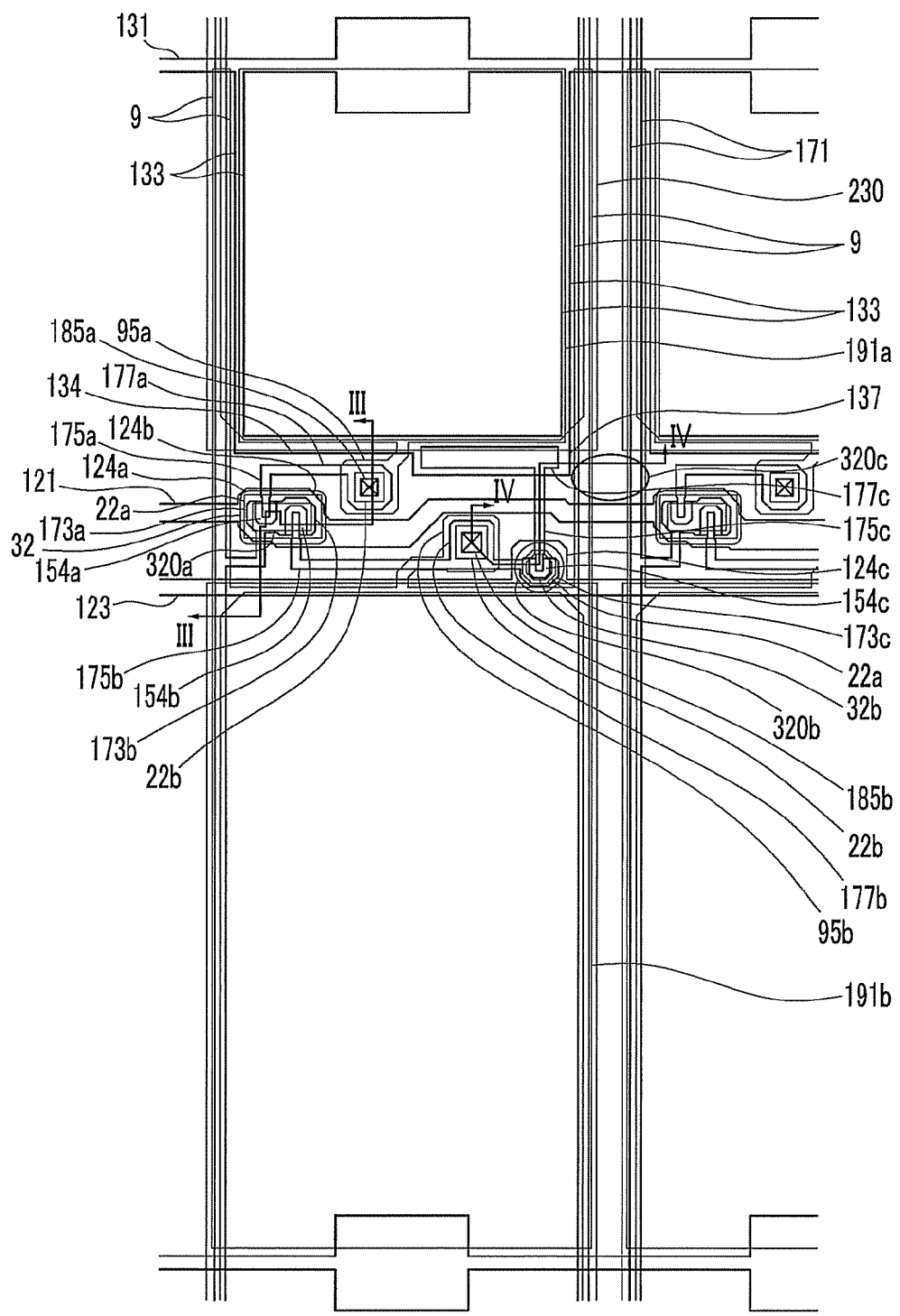
FIG. 2 is a top plan view of an exemplary embodiment of an LCD according to the present invention.
Figure 3:
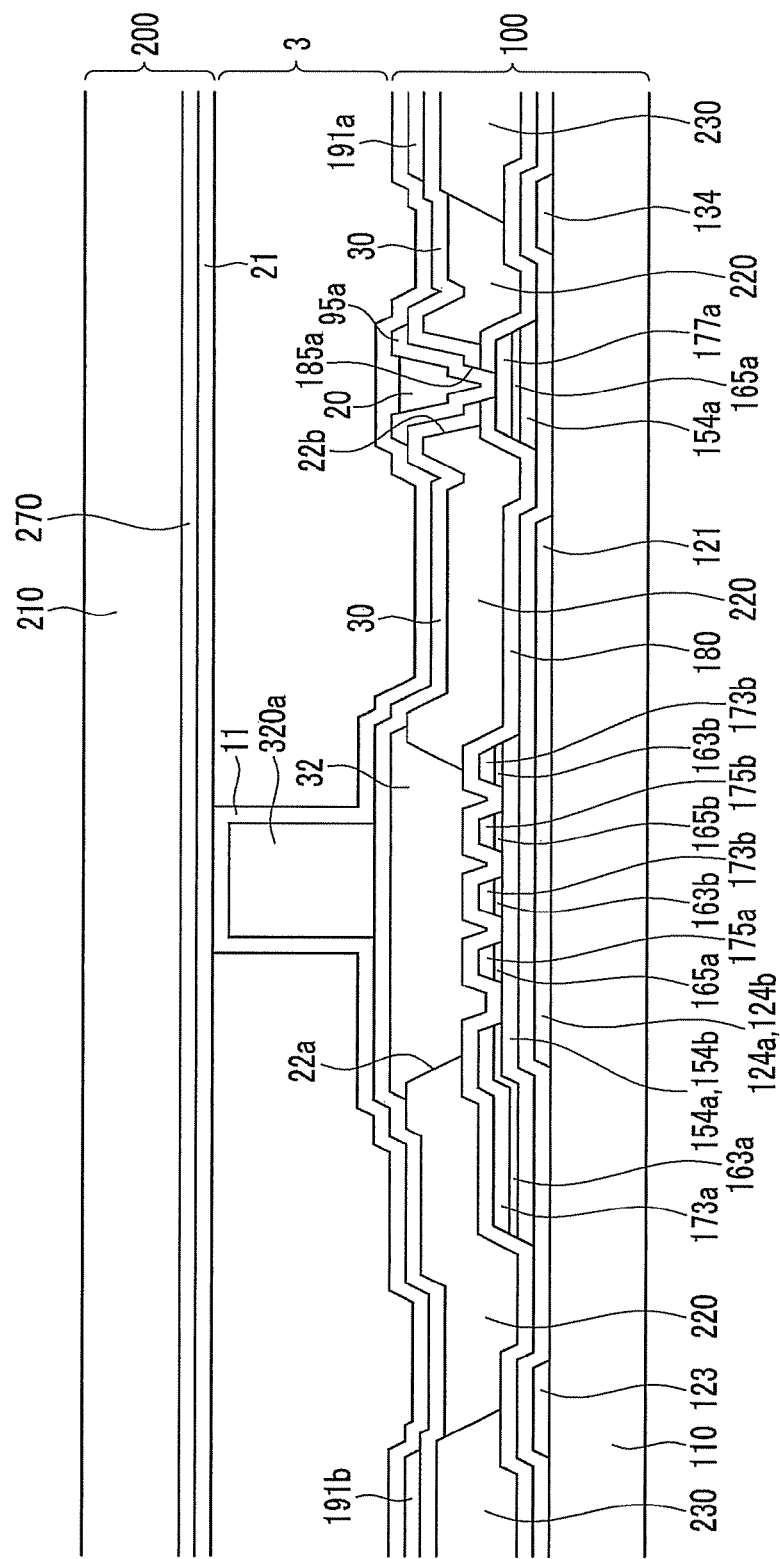
FIG. 3 and FIG. 4 are partial cross-sectional views taken along line III-III and line IV-IV of FIG. 2, respectively.
Figure 4:
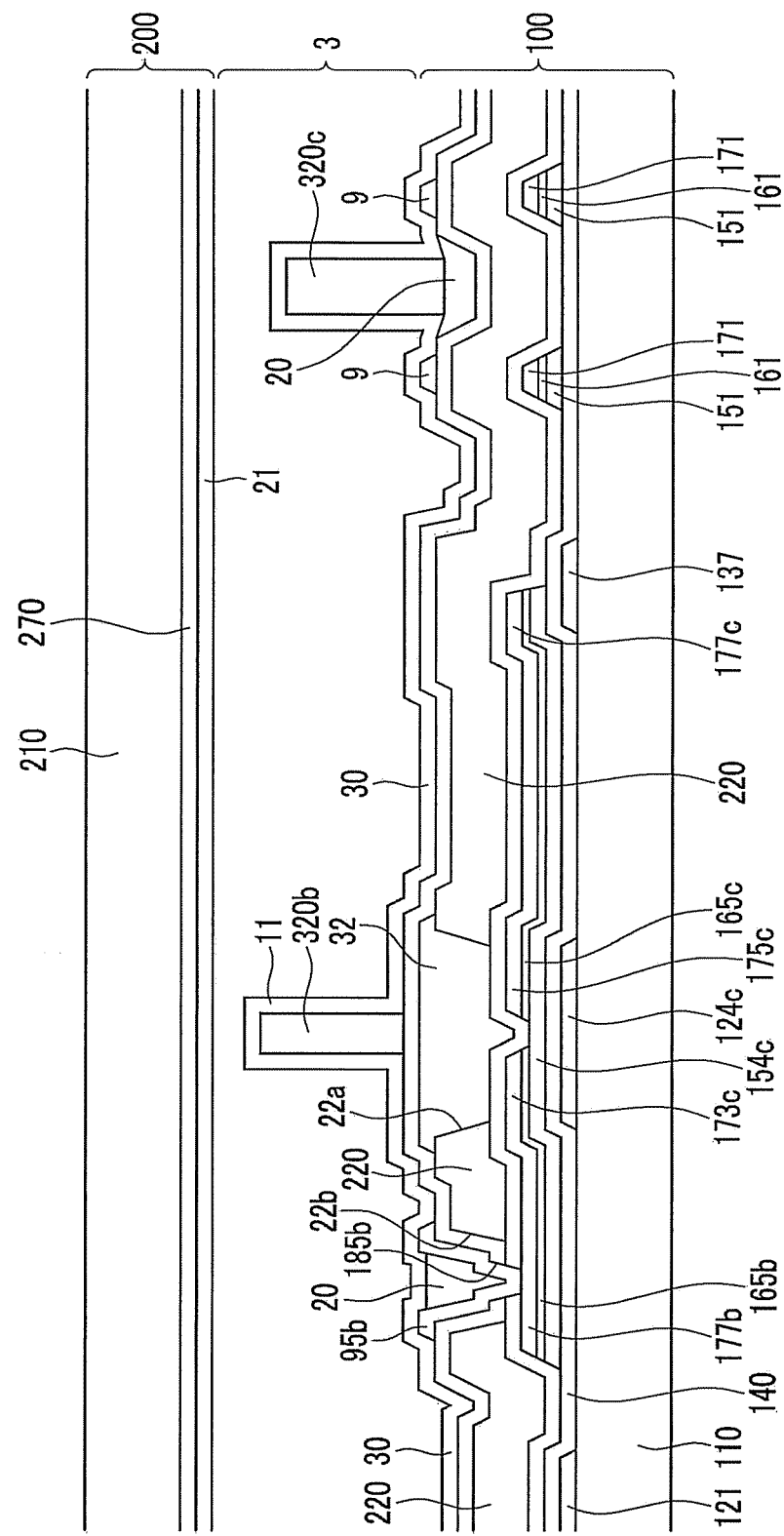
Figure 5:
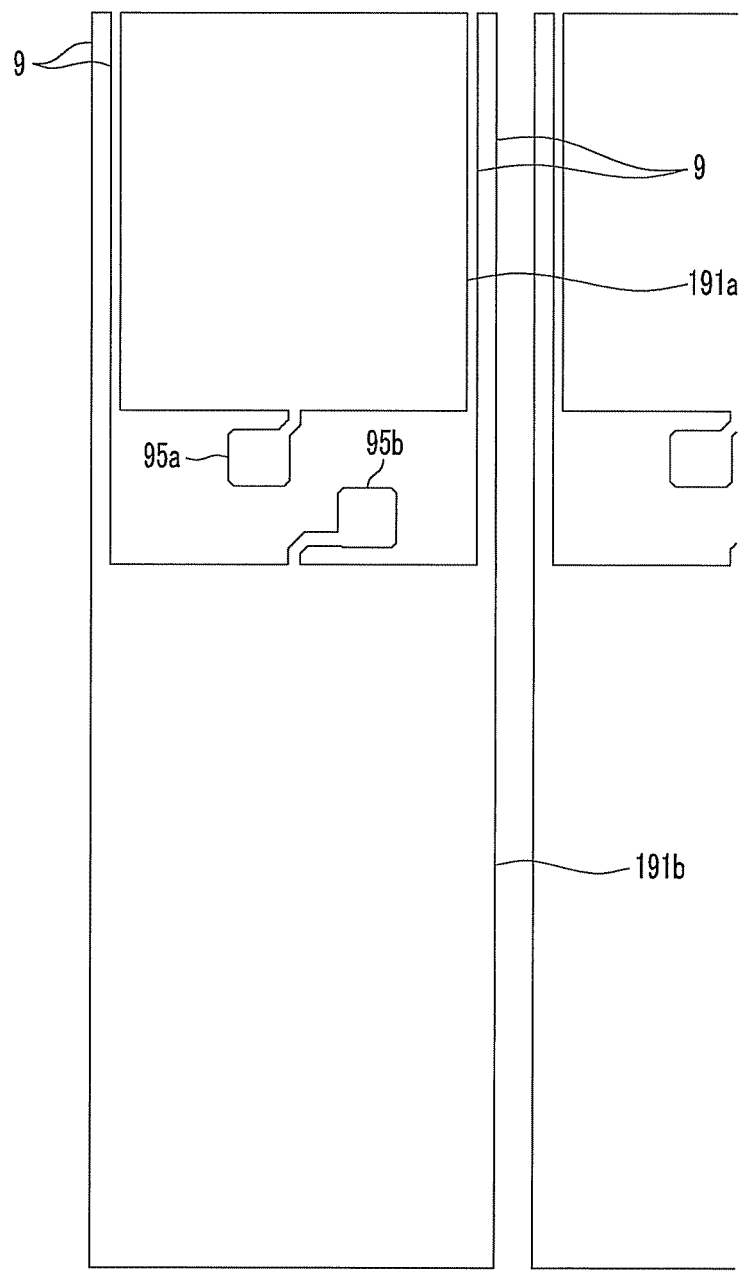
FIG. 5 is a top plan view of a pixel electrode of the exemplary embodiment of an LCD of FIG. 2.
Figure 6:
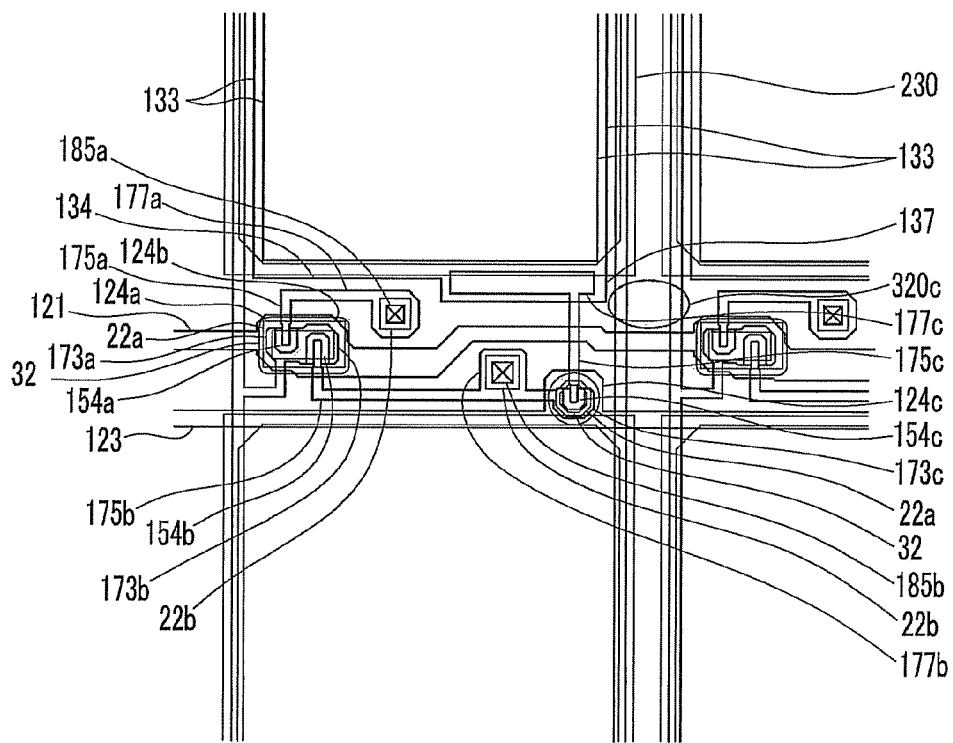
FIG. 6 is an enlarged view of a portion of the exemplary embodiment of an LCD of FIG. 2 except for the pixel electrode.

FIG. 2 is a top plan view of an exemplary embodiment of a liquid crystal display according to the present invention, FIG. 3 and FIG. 4 are partial cross-sectional views taken along line III-III and line IV-IV of FIG. 2, respectively, FIG. 5 is a plan view of a pixel electrode of the liquid crystal display of FIG. 2, and FIG. 6 is an enlarged view of a portion of the liquid crystal display of FIG. 2 except for the pixel electrode.

Referring to FIG. 2 to FIG. 6, an exemplary embodiment of a liquid crystal display includes a lower panel 100 and an upper panel 200 facing each other, a liquid crystal layer 3 interposed between the lower and upper display panels 100 and 200, and a pair of polarizers (not shown) attached at outer surfaces of the lower and upper display panels 100 and 200.

The lower panel 100 will now be described in greater detail.

A plurality of gate conductors including gate lines 121, step-down gate lines 123 and storage electrode lines 125 that are disposed on an insulation substrate 110 including a material such as transparent glass or transparent plastic, for example.

The gate lines 121 and the step-down gate lines 123 transfer gate signals and extend substantially in a transverse direction. Each of the gate lines 121 includes a first gate electrode 124a and a second gate electrode 124b protruding upward and downward therefrom, respectively, and an end portion including a wide portion to be connected to other layers or, alternatively, an external driving circuit.

In an exemplary embodiment, the first gate electrode 124a and the second gate electrode 124b are connected to each other. In an alternative exemplary embodiment, the first gate electrode 124a and the second gate electrode 124b may be disposed apart from each other (not shown).

Each of the step-down gate lines 123 includes a third gate electrode 124c protruding upward therefrom.

The storage electrode lines 125 are extended substantially in the transverse direction and transfer a predetermined voltage. Each of storage electrode lines 131 includes storage electrodes 133 extending downward from the storage electrode line 131. Two neighboring storage electrodes 133 are connected to each other by a storage electrode connection 134 to form a closed loop shape. A transverse portion of the storage electrode connection 134 includes a capacitor conductor 137 having a wide width.

A gate insulating layer 140 is disposed on the gate conductors.

Semiconductor stripes 151 including a material such as amorphous silicon ("a-Si") or crystallization silicon, for example, are disposed on the gate insulating layer 140. The semiconductor stripes 151 are extended substantially in a longitudinal direction, and each of the semiconductor stripes 151 includes a first semiconductor 154a and a second semiconductor 154b extending substantially toward the first and second gate electrodes 124a and 124a, respectively, and connected to each other. In an exemplary embodiment, the each of the semiconductor stripes 151 includes a third semiconductor 154c connected to the second semiconductor 154b.

Ohmic contact stripes 161 are disposed on the semiconductor stripes 151, and each of the ohmic contact stripes 161 includes ohmic contacts, e.g., a first ohmic contact 163a, a second ohmic contact 163b and a third ohmic contact 163c disposed on the first, second and third semiconductors 154a, 154b, and 154c. The ohmic contacts, e.g., the first ohmic contact 163a, the second ohmic contact 163b and the third ohmic contact 163c form pairs with corresponding ohmic contact islands, e.g., a first ohmic contact island 165a, a second ohmic contact island 165b and a third ohmic contact island 165c, respectively.

A data conductor including data lines 171, first drain electrodes 175a, second drain electrodes 175b and third drain electrodes 175c is disposed on the ohmic contacts.

The data lines 171 transmit data signals and extend substantially in the longitudinal direction, thereby intersecting the gate lines 121 and the step-down gate lines 123. Each of the data lines 171 includes a first source electrode 173a and a second source electrode 173b extending toward the first gate electrode 124a and the second gate electrode 124b, and an end portion including a wide portion to be connected to other layers or, alternatively, the external driving circuit. In an alternative exemplary embodiment, the first source electrode 173a and the second source electrode 173b include an oval shaped portion, e.g., a U-like shaped portion, having an opening toward upward or downward thereof. In an exemplary embodiment, the first source electrode 173a and the second source electrode 173b are connected to each other, and the openings of the first source electrode 173a and the second source electrode 173b may be disposed in opposite directions.

At least a portion of an end portion of the first drain electrode 175a is surrounded by the first source electrode 173a, and another end portion of the first drain electrode 175a includes an expansion 177a including a wide portion to be connected to other layers. At least a portion of an end portion of the second drain electrode 175b is surrounded by the second source electrode 173b, and another end portion of the second drain electrode 175b is connected to the third source electrode 173c. Also, an expansion 177b including a wide portion to be connected to other layers may be disposed between the second drain electrode 175b and the third source electrode 173c.

At least a portion of the third drain electrode 175c is surrounded by the third source electrode 173c, and includes an expansion 177c overlapping the capacitor conductor 137.

The first gate electrode 124a, the first source electrode 173a and the first drain electrode 175a form the first thin film transistor along with the semiconductor 154a, the second gate electrode 124b, the second source electrode 173b and the second drain electrode 175b form the second thin film transistor along with the semiconductor 154b, and the third gate electrode 124c, the third source electrode 173c and the third drain electrode 175c form the third thin film transistor along with the semiconductor 154c. Channels of the first, second and third thin film transistors are formed in the semiconductor 154a between the first source electrode 173a and the first drain electrode 175a, in the semiconductor 154b between the second source electrode 173b and the second drain electrode 175b, and in the semiconductor 154c between the third source electrode 173c and the third drain electrode 175c, respectively.

The ohmic contact layer patterns, e.g., the ohmic contact stripes 161 including the first ohmic contact 163a, the second ohmic contact 163b and the third ohmic contact 163c, and the ohmic contact islands 165a, 165b and 165c, are disposed between the semiconductors disposed thereunder, e.g., the first semiconductor 154a, the second semiconductor 154b and the third semiconductor 154c, and the overlying data lines 171, the first drain electrode 175a, the second drain electrode 175b and the third drain electrode 175c to reduce the contact resistance therebetween. The first semiconductor 154a, the second semiconductor 154b and the third semiconductor 154c include exposed portions between the first source electrode 173a and the first drain electrode 175a, between the second source electrode 173b and the second drain electrode 175b, and between the third source electrode 173c and the third drain electrode 175c, respectively.

Plane shapes of the data lines 171, the first drain electrode 175a, the second drain electrode 175b and the third drain electrode 175c are substantially a same as plane shapes of the ohmic contacts layer pattern, e.g., the ohmic contact stripes 161 including the first ohmic contact 163a, the second ohmic contact 163b and the third ohmic contact 163c, and the ohmic contact islands 165a, 165b and 165c, and also have the substantially same plane shape as the first semiconductor 154a, the second semiconductor 154b and the third semiconductor 154c except for the exposed portions thereof between the first source electrode 173a and the first drain electrode 175a, between the second source electrode 173b and the second drain electrode 175b, and between the third source electrode 173c and the third drain electrode 175c.

In an alternative exemplary embodiment, the semiconductor, the ohmic contact layer pattern, the data line and the drain electrodes are formed using masks different from one another, the data line and the drain electrodes may not have the same shape as the ohmic contact layer pattern, and the semiconductor may be formed only on a region overlapping the gate electrodes.

A passivation layer 180 which protects exposed portions of the semiconductors is disposed on the data conductor and the exposed portions of the semiconductors.

A color filter 230 is disposed on the passivation layer 180. The color filter 230 is disposed substantially in a whole pixel region except for a region between the connection 134 of the storage electrode and the step-down gate line 123, and in substantially rectangular shape. Edge portions of the color filter 230 cover data lines 171 adjacent thereto, and a longitudinal boundary line of the color filter 230 is disposed between two neighboring data lines 171 of two neighboring pixels.

The color filter 230 may display one of primary colors such as three primary colors of red, green and blue, for example.

A light blocking member 220 is disposed in a region that the color filter 230 does not cover. The light blocking member 220 is referred to as a black matrix and effectively prevents light leakage.

The light blocking member 220 includes a linear portion disposed along the data line 171 and a sheet portion perpendicularly connected to the linear portion. The sheet portion is disposed along the step-down gate line 123 overlapping a portion of the whole pixel region between the step-down gate line 123 and the connection 134 of the storage electrode. The sheet portion of the light blocking member 220 includes openings that expose a layer disposed thereunder, e.g., a first opening 22a and a second opening 22b. The first opening 22a is disposed in a channel portion of the thin film transistor, and the second opening 22b is disposed in a portion in which a contact hole is disposed.

The height controlling member 32 is disposed in the first opening 22a, or the channel portion of the thin film transistor. The height controlling member 32 includes a material same as a material of the green color filter.

A capping layer 30 is disposed on the color filter 230 and the light blocking member 220. In an embodiment, the capping layer 30 includes silicon nitride, and thereby effectively prevents for the liquid crystal layer 3 from being contaminated due to an outgassing.

Contact holes 185a and 185b that expose the expansion 177a of the first drain electrode 175a and the expansion 177b of the second drain electrode 175b, respectively, are formed through the capping layer 30 and the passivation layer 180.

Pixel electrodes 191 are disposed on the capping layer 30. Each of pixel electrodes 191 includes a first sub-pixel electrode 191a and a second sub-pixel electrode 191b that are disposed on an upper region and a lower region of an individual pixel with respect to the gate line 121 and the step-down gate lines 12, respectively, and the gate line 121 and the step-down gate lines 123 are thereby interposed between the first sub-pixel electrode 191a and the second sub-pixel electrode 191b.

In an exemplary embodiment, the second sub-pixel electrode 191b includes an outer stem 9 extending substantially along a longitudinal edge of the first sub-pixel electrode 191a, and the outer stem 9 effectively prevents a capacitive coupling between the data line 171 and the first sub-pixel electrode 191a.

The first sub-pixel electrode 191a and the second sub-pixel electrode 191b include a first protrusion 95a and a second protrusion 95b, respectively. The first protrusion 95a of the first sub-pixel electrode 191a is connected to the expansion 177a of the first drain electrode 175a and receives the data voltage through the first contact hole 185a. The second protrusion 95b of the second sub-pixel electrode 191b is connected to the expansion 177b disposed between the second drain electrode 175b and the third source electrode 173c and receives the data voltage through the second contact hole 185b.

Spacers 320, as described above, may be disposed on the height controlling member 32. The spacers 320 include the first spacer 320a, the second spacer 320b and the third spacer 320c, having heights different from one another.

The first spacer 320a is in contact with the upper panel 200 and the lower panel 100, and supports the upper panel 200 and the lower panel 100 as a main spacer that maintains the cell gap.

The second spacer 320b and the third spacer 320c are not in contact with the upper panel 200 as assistance spacers that maintain the cell gap against an external impact.

In an exemplary embodiment, the upper surface of the second spacer 320b is disposed below the upper surface of the first spacer 320a at a distance in a range from 0.3 μm to 0.7 μm with respect to the plane defined by the upper surface of the first spacer 320a, and the upper surface of the third spacer 320c is disposed below the upper surface of the first spacer 320a at a distance in a range from 0.8 μm to 1.2 μm with respect to the plane defined by the upper surface of the first spacer 320a.

A colored member 20 is disposed on the pixel electrode 191. The colored member 20 corresponds to the opening 22b where the contact hole is disposed, compensates cut-out portions due to the contact holes 185a and 185b, and blocks light leakage near the contact holes 185a and 185b.

In an exemplary embodiment, the colored member 20 may include a material same as a material of the spacer 320 and may include an organic material and a black coloring material, for example. In an exemplary embodiment, a photo density of the organic material of the colored member 20 is greater than 4.0.

The colored member 20 and the spacer 320 may be simultaneously formed through an exposure and development processes using a photo mask having a slit pattern. In case of the positive photosensitivity, the slit pattern is positioned at the portion where the colored member 20 is formed, and the portion where the spacer 320 is formed is completely exposed. In contrast, in case of the negative photosensitivity, the light is blocked at the portion where the spacer 320 is formed.

In an exemplary embodiment, a bottom area of the first spacer 320a, a bottom area of the second spacer 320b and a bottom area of the third spacer 320c are different from one another. In an exemplary embodiment, as the bottom area of the spacer is increased, the height of the spacer is increased. However, when the height of the spacer reaches at the predetermined height, although the bottom area of the spacer is increased, the height of the spacer is not increased.

Accordingly, the heights of the first spacer, the second spacer and the third spacer may be changed by controlling the bottom areas of the first spacer, the second spacer and the third spacers.

In an exemplary embodiment, the height of the third spacer 320c is greater than the heights of the first spacer 320a and the second spacer 320b since the first spacer 320a and the second spacer 320b are disposed on the height controlling member while the third spacer 320c is disposed on a portion of the light blocking member 220 disposed between the two neighboring data lines 171.

Figure 7:
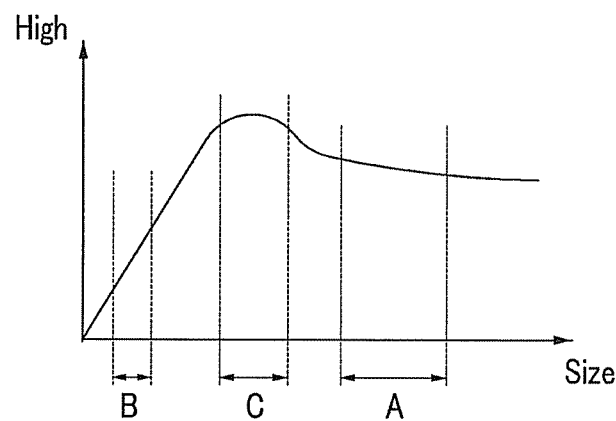
FIG. 7 is a graph of height versus bottom area of an exemplary embodiment of a spacer according to the present invention.

FIG. 7 is a graph of height versus bottom area of the spacer.

Referring now to FIG. 7, the first spacer 320a is formed to have a bottom area in a range of A, the second spacer 320b is formed to have a bottom area in a range of B, and the third spacer 320c is formed to have a bottom area in a range of C.

Although the height of the third spacer 320c is the greatest, and the light blocking member 220 is disposed thereunder, the upper surface of the third spacer 320c is disposed below the upper surfaces of the first spacer 320a and the second spacer 320b disposed on the height controlling member on the thin film transistor.

In an exemplary embodiment, the first spacer 320a is the main spacer that contacts and supports the upper and the lower panels 100 and 200, the bottom area of the first spacer 320a may be greater than the bottom areas of the second spacer 320b and the third spacer 320c.

The cross section shapes of a lower portion of the first spacer 320a, the cross sectional shape of a lower portion of the second spacer 320b and the cross sectional shape of a lower portion of the third spacer 320c may be varied. In an exemplary embodiment, the cross sectional of the lower portion of the first spacer 320a may have a shape of a rectangle, the cross section of the lower portion of the second spacer 320b may have a shape of an octagon, and the cross section of the lower portion of the third spacer 320c may have a shape of a circle, but the cross sectional shapes of lower portions of the spacers not being limited thereto.

The shape of the lower portion of the spacer may be changed based on the area of a portion in which one of the first spacer 320a, the second spacer 320b and the third spacer 320c is disposed. In an exemplary embodiment, when the bottom area of the spacer is substantially small, e.g., the second spacer 320a, more than one spacer may be disposed.

An alignment layer 11 is disposed on the pixel electrode 191 and the spacer 320. In an exemplary embodiment, the alignment layer may be a vertical alignment layer.

The upper panel 200 will now be described in greater detail.

A common electrode 270 is disposed on the insulation substrate 210. An alignment layer 21 is disposed on the common electrode 270. In an exemplary embodiment, the upper alignment layer may be the vertical alignment layer.

The liquid crystal layer 3 has negative dielectric anisotropy. The liquid crystal molecules of the liquid crystal layer 3 are arranged such that a longitudinal axis of the liquid crystal molecules are substantially perpendicular to the surfaces of the lower and upper panels 100 and 200 when an electric field is not generated therein.

Figure 8:
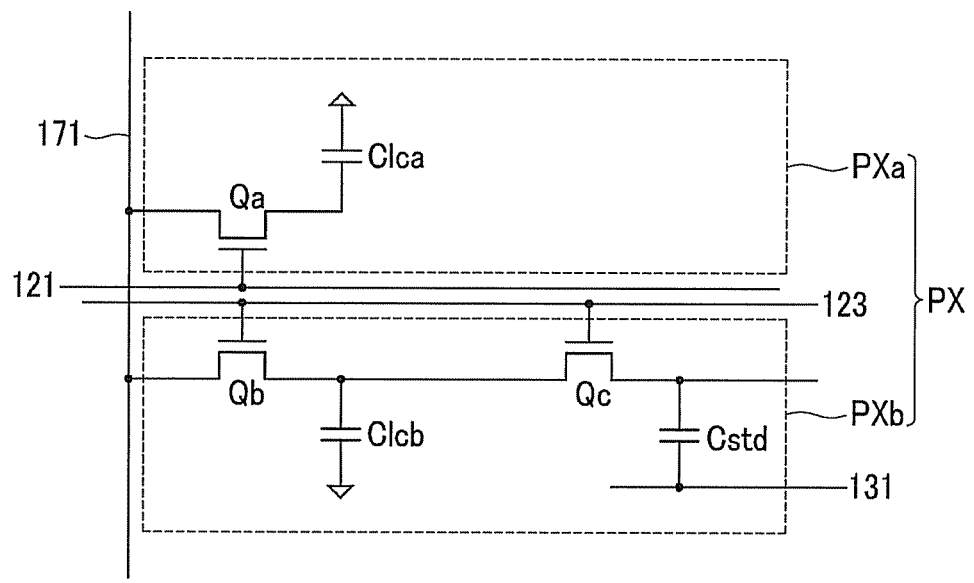
FIG. 8 is a schematic circuit diagram of an exemplary embodiment of a pixel of an exemplary embodiment of an LCD according to the present invention.

FIG. 8 is a schematic circuit diagram of an exemplary embodiment of a pixel of the liquid crystal display.

Referring back to FIGS. 2 to 6 and as shown in FIG. 8, the liquid crystal display includes signal lines including the gate line 121, the storage electrode line 131, the step-down gate line 123 and the data line 171, and a pixel PX connected thereto.

The pixel PX includes a first switching element Qa, a second switching element Qb and a third switching element Qc, a first liquid crystal capacitor Clca, a second liquid crystal capacitor Clcb and a step-down capacitor Cstd.

Here, the first switching element Qa and the first thin film transistor Qa, the second switching element Qb and the second thin film transistor Qb, and the third switching element Qc and the third thin film transistor Qc, are referred to as the same reference numerals, respectively.

Each of first and second switching elements Qa and Qb as three-terminal elements, e.g., the thin film transistor of the lower panel 100, has a control terminal connected to the gate line 121, an input terminal connected to the data line 171 and an output terminal connected to the first and second liquid crystal capacitors Clca and Clcb.

The third switching element Qc, as a three-terminal element, e.g., the thin film transistor of the lower panel 100, has a control terminal connected to the step-down gate line 123, an input terminal connected to the second liquid crystal capacitor Clcb and an output terminal connected to the step-down capacitor Cstd.

The first and second liquid crystal capacitors Clca and Clcb are formed by overlapping the first and second sub-pixel electrodes 191a and 191b connected to the first and second switching elements Qa and Qb with the common electrode 270 of the upper panel 200.

The step-down capacitor Cstd is connected to the output terminal of the third switching element Qc, and is formed by overlapping the storage electrode line 131 provided in the lower panel 100 with the output terminal of the third switching element Qc via an insulator.

When the gate-on voltage is applied to the gate line 121, the first thin film transistor Qa and the second thin film transistor Qb connected thereto are turned on.

Accordingly, the data voltage of the data line 171 is applied to the first sub-pixel electrode 191a and the second sub-pixel electrode 191b through the turned-on first switching element Qa and the second switching element Qb. The first liquid crystal capacitor Clca and the second liquid crystal capacitor Clcb are charged by a potential difference between the common voltage of the common electrode 270 and the voltage of the first sub-pixel electrode 191a and the second sub-pixel electrode 191b such that the charged voltage of the first liquid crystal capacitor Clca is substantially equal to the charged voltage of the second liquid crystal capacitor Clcb. Here, the step-down gate line 123 receives the gate-off voltage.

When the gate line 121 receives the gate-off voltage, and simultaneously the step-down gate line 123 receives the gate-on voltage, the first switching element Qa and the second switching element Qb connected to the gate line 121 are turned off, and the third switching element Qc is turned-on. Accordingly, the charges of the second sub-pixel electrode 191b connected to the output terminal of the second switching element Qb flow into the step-down capacitor Cstd such that the voltage of the second liquid crystal capacitor Clcb is decreased.

In an exemplary embodiment, when the liquid crystal display is driven by a method of frame inversion, the data line 171 receives a positive data voltage with respect to the common voltage in a present frame, and negative charges flow into the step-down capacitor Cstd after a previous frame. In the present frame, when the third switching element Qc is turned on, the positive charges of the second sub-pixel electrode 191b flow into the step-down capacitor Cstd through the third switching element Qc such that the positive charges are accumulated in the step-down capacitor Cstd and the voltage of the second liquid crystal capacitor Clcb is decreased. In a succeeding frame, the third switching element Qc is turned on in a state in which the second sub-pixel electrode 191*b* is negatively charged such that the negative charges of the second sub-pixel electrode 191*b* flow into the step-down capacitor Cstd, and the negative charges are thereby accumulated in the step-down capacitor Cstd and the voltage of the second liquid crystal capacitor Clcb is decreased.

As described above, in an exemplary embodiment, the charging voltage of the second liquid crystal capacitor Clcb is lower than the charging voltage of the first liquid crystal capacitor Clca constantly, regardless of the polarity of the data voltage.

The liquid crystal molecules of the liquid crystal layer 3 are arranged corresponding to the electric field such that the longitudinal axes thereof are aligned substantially vertically to a direction of the electric field, and the polarization of the light incident to the liquid crystal layer 3 is changed according to the inclination angles of the liquid crystal molecules. The change of the polarization of the light changes the transmittance of the light when passing through a polarizer and a liquid crystal display thereby displays an image.

In a liquid crystal layer, the inclination angles of the liquid crystal molecules are changed depending upon the intensity of the electric field. In an exemplary embodiment, since the charging voltages of the first liquid crystal capacitor Clca and the second liquid crystal capacitor Clcb differ from each other, the inclination angles of the liquid crystal molecules corresponding to a first sub-pixel PXa and the inclination angles of the liquid crystal molecules corresponding to the second sub-pixel PXb differ from each other such that the luminance of the first sub-pixel PXa and the second sub-pixel PXb differ from each other. In an exemplary embodiment, the charging voltages of the first and second liquid crystal capacitors Clca and Clcb are adjusted such that an image viewed from the side is substantially similar to an image viewed from the front, and the side visibility is thereby substantially improved.

In an alternative exemplary embodiment, the first and second switching elements Qa and Qb of the first and second sub-pixel electrodes 191*a* and 191*b* may receive different data voltages through different data lines, for example, or may receive the different data voltages from one image information signal at different times. In another alternative exemplary embodiment, the third switching element Qc and the step-down capacitor Cstd may be omitted.

Figure 9:
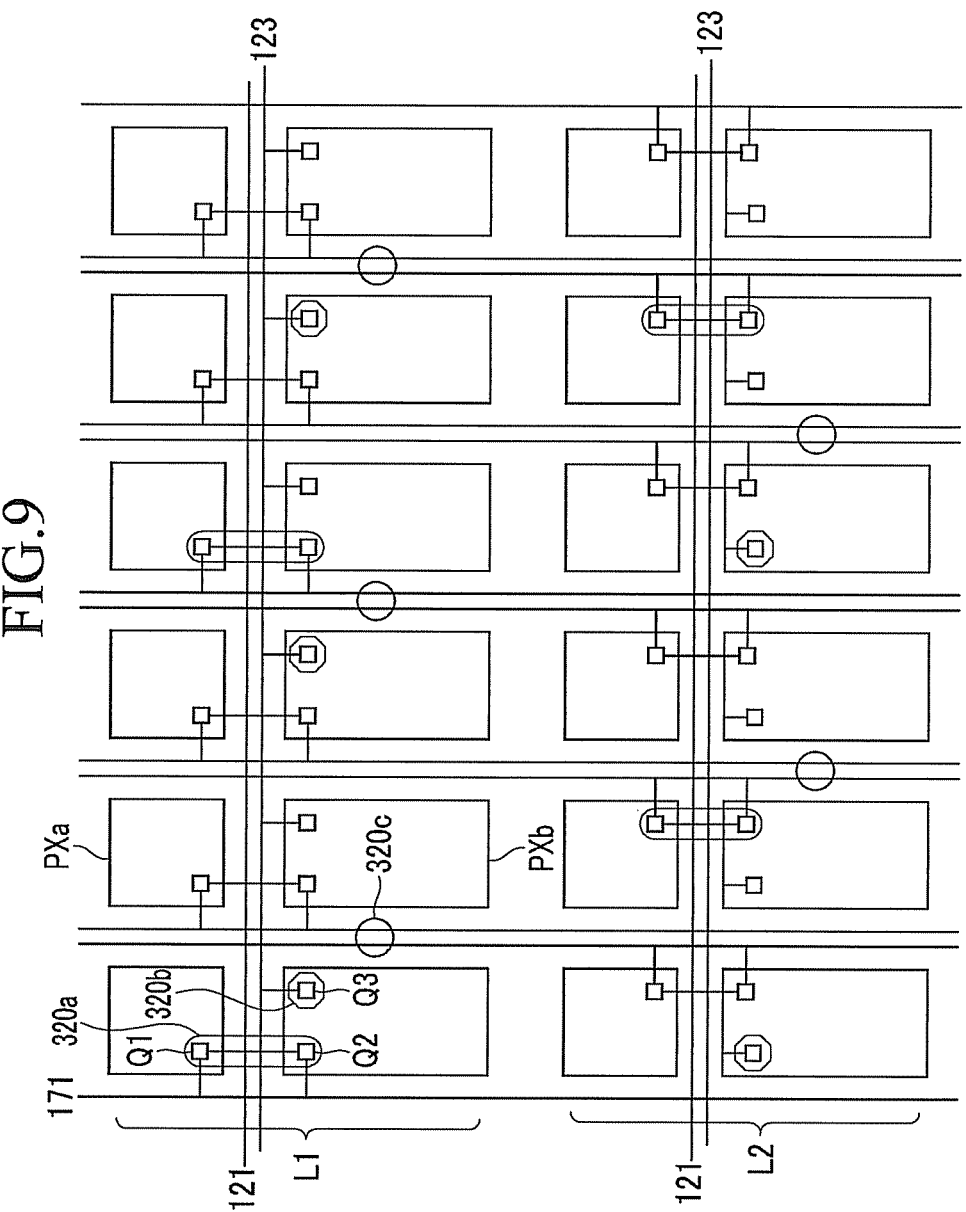
FIGS. 9 and 10 are schematic views showing connections of data lines and gate lines, and thin film transistors of an exemplary embodiment of an LCD according to the present invention.
Figure 10:
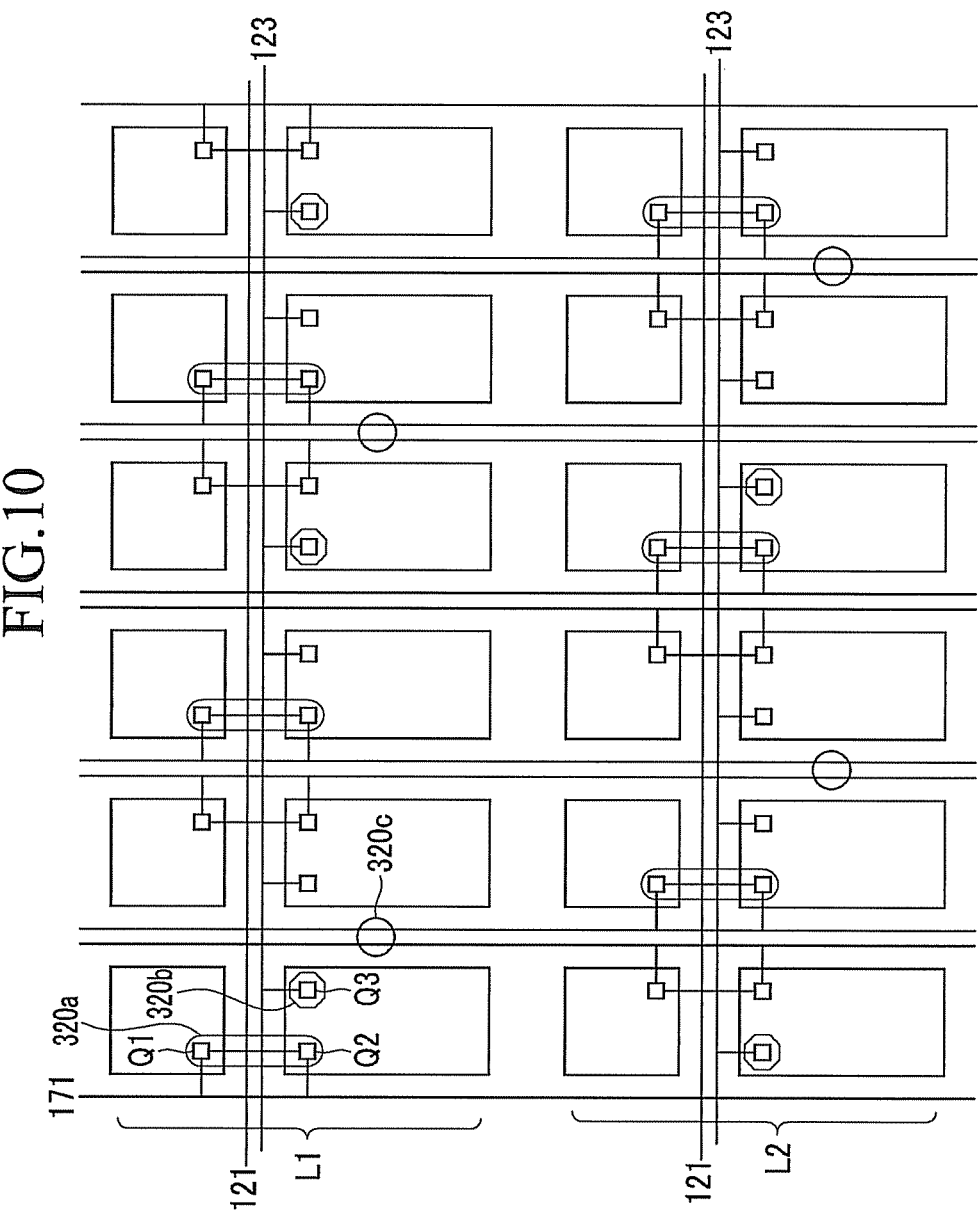

FIGS. 9 and 10 are schematic views showing connections of data lines and gate lines and thin film transistors according to an exemplary embodiment of a liquid crystal display according to the present invention.

Referring now to FIGS. 9 and 10, the gate lines 121 and the data lines 171 are connected to the thin film transistors, e.g., a first thin film transistor Q1 and a second thin film transistor Q2, and the step-down gate line 123 is connected to a third thin film transistor Q3. The thin film transistors connected to the first and second sub-pixel electrodes PXa and PXb, respectively, are connected.

Referring again to FIG. 9, the thin film transistors disposed in an odd numbered pixel row (e.g., a first pixel row L1) and an even numbered pixel row (e.g., a second pixel row L2) are connected to the odd-numbered data lines and the even-numbered data lines, respectively.

Accordingly, when the odd-numbered data lines transmit a positive voltage with respect to a common voltage and the even-numbered data lines transmit a negative voltage with respect to the common voltage, voltages having same polarity are applied to pixels in a same pixel row, and a line inversion, in which voltages having different polarities are alternately applied to two adjacent pixel rows, may be utilized.

In an alternative exemplary embodiment, as shown in FIG. 10, when the thin film transistors and the pixel electrodes that are connected to two neighboring data lines (e.g., one of the odd-numbered data line and one of the even-numbered data line) are disposed substantially symmetrically, a dot inversion, in which the neighboring pixels alternately receive voltages having different polarities, may be utilized.

More particularly, although the odd-numbered data lines transmit a positive voltage with respect to the common voltage and the even-numbered data lines transmit a negative voltage with respect to the common voltage, voltages having same polarity are applied to pixels in a same pixel row, a, the voltages having different polarities are alternately applied whenever the rows are changed or the columns are changed, and the dot inversion is thereby utilized.

In an exemplary embodiment, the first spacer 320*a*, the second spacer 320*b* and the third spacer 320*c* are not formed in every pixel, as shown in FIGS. 9 and 10, but formed in every certain number of pixels considering the area of the substrate in which the spacers may be disposed. In an exemplary embodiment, a pixel may include one or two of the first spacer 320*a*, the second spacer 320*b* and the third spacer 320*c*, and the total sum of bottom areas of first spacers included in a liquid crystal display is in a range from 0.2 percent (%) to 0.3 percent (%) of the total display area of the liquid crystal display.

While the present invention has been described herein with reference to exemplary embodiments thereof, it will be understood that the present invention should not be construed as being limited to the exemplary embodiments set forth herein. Rather, these exemplary embodiments are provided so that this disclosure will be thorough and complete and will fully convey the concept of the present invention to those skilled in the art.

Moreover, while the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
   a first insulation substrate;
   a plurality of gate lines disposed on the first insulation substrate;
   a plurality of data lines disposed on the first insulation substrate substantially oblique to the plurality of gate lines;
   a plurality of thin film transistors connected to the plurality of gate lines and the plurality of data lines;
   a plurality of pixel electrodes respectively connected to the plurality of thin film transistors;
   a second insulation substrate disposed substantially opposite to the first insulation substrate;
   a plurality of column spacers disposed between the first insulation substrate and the second insulation substrate and which supports the first insulation substrate and the second insulation substrate;
   a light blocking member disposed on the first insulation substrate and including a sheet portion, wherein the sheet portion of the light blocking member includes an opening;

a height controlling member disposed at the opening of the sheet portion of the light blocking member, wherein the plurality of column spacers is disposed on at least one of the height controlling member, and the opening of the sheet portion of the light blocking member overlaps a thin fil transistor of the plurality of thin film transistors.

2. The liquid crystal display of claim 1, further comprising:
a red color filter disposed on the first insulation substrate;
a green color filter disposed on the first insulation substrate; and
a blue color filter disposed on the first insulation substrate,
wherein the height controlling member includes a material substantially similar to a material of one of the red color filter, the green color filter and the blue color filter.

3. A liquid crystal display comprising:
a first insulation substrate;
a plurality of gate lines disposed on the first insulation substrate;
a plurality of data lines disposed on the first insulation substrate substantially oblique to the plurality of gate lines;
a plurality of thin film transistors connected to the plurality of gate lines and the plurality of data lines;
a plurality of pixel electrodes respectively connected to the plurality of thin film transistors;
a second insulation substrate disposed substantially opposite to the first insulation substrate;
a plurality of column spacers disposed between the first insulation substrate and the second insulation substrate and which supports the first insulation substrate and the second insulation substrate;
a light blocking member disposed on the first insulation substrate and including a sheet portion, wherein the sheet portion of the light blocking member includes an opening;
a height controlling member disposed at the opening of the sheet portion of the light blocking member,
wherein
the plurality of column spacers is disposed on at least one of the height controlling member,
the plurality of column spacers includes a first spacer, a second space and a third spacer,
a height of the first spacer a height of the second spacer and a height of the third spacer are different from one another, and
at least one of the first spacer and the second spacer are disposed on the height controlling member.

4. The liquid crystal display of claim 3, wherein
the height of the first spacer is greater than the height of the second spacer and less than the height of the third spacer, and
the first spacer is in contact with the first insulation substrate and the second insulation substrate.

5. The liquid crystal display of claim 4, wherein
an upper surface of the second spacer is disposed below an upper surface of the first spacer at a distance in a range from about 0.3 micrometers to about 0.7 micrometers with respect to a plane defined by the upper surface of the first spacer.

6. The liquid crystal display of claim 4, wherein
an upper surface of the third spacer is disposed below the upper surface of the first spacer at a distance in a range from about 0.8 micrometers to about 1.2 micrometers with respect to a plane defined by the upper surface of the first spacer.

7. The liquid crystal display of claim 3, wherein
a bottom area of the third spacer is less than a bottom area of the first spacer and greater than a bottom area of the second spacer.

8. The liquid crystal display of claim 7, wherein
a cross section of a lower portion of the first spacer has a shape of a rectangle, a cross section of a lower portion of the second spacer has a shape of an octagon, and a cross section of a lower portion of the third spacer has a shape of a circle.

9. The liquid crystal display of claim 3, wherein
the light blocking member further includes a linear portion extending substantially along the plurality of data lines,
the sheet portion is substantially perpendicularly connected to the linear portion, and
the third spacer is disposed on the linear portion.

10. The liquid crystal display of claim 1, further comprising:
a contact hole through which a pixel electrode of the plurality of pixel electro connected to a thin film transistor of the plurality of thin film transistors; and
a colored member disposed on the pixel electrode of the plurality of pixel electrodes corresponding to the contact hole,
wherein the colored member compensates a cut-out portion due to the contact hole.

11. The liquid crystal display of claim 10, wherein the colored member and the spacer include a same material.

12. The liquid crystal display of claim 1, wherein
the first insulation substrate includes a display area which includes the pixel electrode, and
the sum of the bottom area of the first spacer of the plurality of column spacers is in the range from about 0.2% to about 0.3% of the display area.

13. A liquid crystal display comprising:
a first insulation substrate;
a plurality of gate lines disposed on the first insulation substrate;
a plurality of data lines disposed on the first insulation substrate substantially oblique to the plurality of gate lines;
a plurality of thin film transistors connected to the plurality of gate lines and the plurality of data lines;
a plurality of pixel electrodes respectively connected to the plurality of thin film transistors;
a second insulation substrate disposed substantially opposite to the first insulation substrate;
a plurality of column spacers disposed between the first insulation substrate and the second insulation substrate and which supports the first insulation substrate and the second insulation substrate;
a light blocking member disposed on the first insulation substrate and including a sheet portion, wherein the sheet portion of the light blocking member includes an opening;
a height controlling member disposed at the opening of the sheet portion of the light blocking member,
wherein the plurality of column spacers is disposed on at least one of the height controlling member, and
wherein the pixel electrode of the plurality of pixel electrodes includes a first sub-pixel electrode disposed on an upper portion of an individual pixel and a second sub-pixel electrode disposed on a lower portion of an individual pixel.

14. The liquid crystal display of claim 13, wherein
the plurality of thin film transistors includes a first thin film transistor connected to the first sub-pixel electrode and a second thin film transistor connected to the second sub-pixel electrode, and
the second sub-pixel electrode is connected to a step-down capacitor.

15. The liquid crystal display of claim 14, wherein the sheet portion of the light blocking member is disposed between the first sub-pixel electrode and the second sub-pixel electrode.

16. The liquid crystal display of claim 14, wherein:
the plurality of thin film transistors includes a third thin film transistor connected to the step-down capacitor; and
an assistance height controlling member is disposed on the third thin film transistor.

17. The liquid crystal display of claim 16, wherein
the sheet portion of the light blocking member includes an opening which exposes the third thin film transistor, and
the assistance height controlling member is disposed at the opening which exposes the third thin film transistor.

18. The liquid crystal display of claim 16, further comprising:
a red color filter disposed on the first insulation substrate;
a green color filter disposed on the first insulation substrate; and
a blue color filter disposed on the first insulation substrate,
wherein the assistance height controlling member includes a material substantially similar to a material of one of the red color filter, the green color filter and the blue color filter.

19. The liquid crystal display of claim 16, further comprising:
a height controlling member disposed on the first thin film transistor and the second thin film transistor,
wherein the gate electrodes of the first thin film transistor and the second thin film transistor are commonly connected.

20. The liquid crystal display of claim 19, wherein:
the sheet portion includes an opening which exposes the first thin film transistor and the second thin film transistor, and
the height controlling member is disposed at the opening which exposes the first thin film transistor and the second thin film transistor.

21. The liquid crystal display of claim 20, wherein:
the first spacer is disposed on the height controlling member, and
the second spacer is disposed on the assistance height controlling member.

22. The liquid crystal display of claim 15, further comprising:
a first contact hole through which the first sub-pixel electrode is connected to the first thin film transistor;
a second contact hole through which the second sub-pixel electrode is connected to the second thin film transistor; and
a colored member disposed on at least one of the first sub-pixel electrode and the second sub-pixel electrode corresponding to the first contact hole and the second contact hole, respectively,
wherein the colored member compensates a cut-out portion due to the at least one of the first contact hole and the second contact hole.

23. The liquid crystal display of claim 22, wherein the colored member and the spacer include a same material.

24. The liquid crystal display of claim 15, wherein the sheet portion includes an opening which exposes the first contact hole and the second contact hole.

* * * * *